US012771443B2

(12) United States Patent
Iwano et al.

(10) Patent No.: US 12,771,443 B2
(45) Date of Patent: Oct. 20, 2026

(54) OPTICAL FIBER SENSING SYSTEM, OPTICAL FIBER SENSING METHOD, AND ONU

(71) Applicant: NEC Corporation, Tokyo (JP)

(72) Inventors: Tadayuki Iwano, Tokyo (JP); Yoshiaki Aono, Tokyo (JP); Naoto Saeki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 264 days.

(21) Appl. No.: 18/698,813

(22) PCT Filed: Oct. 28, 2021

(86) PCT No.: PCT/JP2021/039856
§ 371 (c)(1),
(2) Date: Apr. 5, 2024

(87) PCT Pub. No.: WO2023/073876
PCT Pub. Date: May 4, 2023

(65) Prior Publication Data
US 2024/0405865 A1 Dec. 5, 2024

(51) Int. Cl.
*H04B 10/071* (2013.01)
*H04Q 11/00* (2006.01)

(52) U.S. Cl.
CPC ....... *H04B 10/071* (2013.01); *H04Q 11/0067* (2013.01); *H04Q 2011/0081* (2013.01)

(58) Field of Classification Search
CPC .............. H04B 10/071; H04B 10/0771; H04B 10/0791; H04Q 11/0067; H04Q 2011/0081; H04Q 2011/0083
See application file for complete search history.

(56) References Cited

U.S. PATENT DOCUMENTS 6,269,204 B1 7/2001 Ishikawa
6,534,997 B1 3/2003 Horishita et al.
(Continued)

FOREIGN PATENT DOCUMENTS

EP 1986350 A1 * 10/2008 ........... H04B 10/071
JP 2001-136110 A 5/2000
(Continued)

OTHER PUBLICATIONS

JP Office Communication for JP Application No. 2023-555988, mailed on Nov. 25, 2025 with English Translation.
(Continued)

*Primary Examiner* — Hibret A Woldekidan
(74) *Attorney, Agent, or Firm* — Sughrue Mion, PLLC

(57) ABSTRACT

An OLT, a plurality of ONUs, an optical fiber connected to the OLT, a plurality of optical fibers connected to each of the plurality of ONUs, an optical output unit configured to output pulsed light to the optical fiber, a plurality of reflection units provided in each of the plurality of optical fibers, a branching unit configured to connect the optical fiber and each of the plurality of optical fibers, an optical input unit configured to receive the reflected light from the optical fiber, and a detection unit configured to analyze a pattern of the reflected light to detect a failure of the optical fiber provided with the reflection unit that has output the reflected light are provided, in which each of the plurality of reflection units can individually switch execution of reflection of the pulsed light.

13 Claims, 7 Drawing Sheets

(56) References Cited

U.S. PATENT DOCUMENTS

| | | | | |
|---|---|---|---|---|
| 9,391,695 | B2 * | 7/2016 | Piehler | H04B 10/071 |
| 2008/0062408 | A1 * | 3/2008 | Lai | H04J 14/0282 356/73.1 |
| 2013/0202290 | A1 * | 8/2013 | Dvir | H04B 10/071 398/28 |
| 2020/0200592 | A1 * | 6/2020 | Huang | H04B 10/071 |

FOREIGN PATENT DOCUMENTS

| | | | |
|---|---|---|---|
| JP | 2000-183821 | A | 6/2000 |
| JP | 2011-035598 | A | 2/2011 |

OTHER PUBLICATIONS

International Search Report for PCT Application No. PCT/JP2021/039856, mailed on Jan. 25, 2022.

* cited by examiner

OPTICAL FIBER SENSING SYSTEM, OPTICAL FIBER SENSING METHOD, AND ONU

This application is a National Stage Entry of PCT/JP2021/039856 filed on Oct. 28, 2021, the contents of all of which are incorporated herein by reference, in their entirety.

TECHNICAL FIELD

The present disclosure relates to an optical fiber sensing system, an optical fiber sensing method, and an optical network unit (ONU).

BACKGROUND ART

A passive optical network (PON) system is known as one of technologies for realizing fiber to the home (FTTH) in which an optical fiber transmission line is drawn from a communication office building into a user's house. A typical configuration of the PON system is a configuration in which a plurality of ONUs on the user side are connected to one optical line terminal (OLT) on the communication office building side via an optical fiber transmission line.

In addition, a technology for detecting a failure of the optical fiber transmission line in the PON system is also known. For example, Patent Literature 1 discloses a technology for detecting a failure of an optical fiber transmission line in a wavelength division multiplexing (WDM)-PON system.

Specifically, in Patent Literature 1, the WDM-PON system has a configuration in which an OLT and a branching device are connected by a single common optical fiber line, and the branching device and each of a plurality of ONUs are connected by a plurality of individual optical fiber lines. The plurality of individual optical fiber lines are assigned different wavelengths and have different lengths. In addition, the plurality of ONUs have a function of totally reflecting incident light by a mirror or the like in a communication stop state. An optical line failure search device enters a broadband light pulse into the WDM-PON system during a communication stop period via the common optical fiber line, and the branching device divides the broadband light pulse into wavelength components and outputs the wavelength components to the plurality of individual optical fiber lines. Then, the optical line failure search device receives backscattered light of each wavelength component and total reflected light from each of the plurality of ONUs. In this case, in a time waveform obtained by combining the wavelength components, since the lengths of the plurality of individual optical fiber lines are different from each other, the total reflection components by the ONUs are separately displayed at different locations. Therefore, the optical line failure search device compares the time waveform with a reference waveform, determines which wavelength of the total reflection component does not appear in the time waveform, and determines that a failure has occurred in the individual optical fiber line to which the wavelength at which the total reflection component does not appear is allocated.

CITATION LIST

Patent Literature

Patent Literature 1: Japanese Unexamined Patent Application Publication No. 2011-035598

SUMMARY OF INVENTION

Technical Problem

Meanwhile, as another technology for detecting a failure in an optical fiber transmission line, an optical fiber sensing technology is also known.

Specifically, in optical fiber sensing, an optical fiber sensing device outputs pulsed light to an optical fiber transmission line, and receives return light such as backscattered light or reflected light with respect to the pulsed light. In this case, the pattern of the return light is different depending on the presence or absence of a failure in the optical fiber transmission line. Therefore, the optical fiber sensing device detects the failure in the optical fiber transmission line by analyzing the pattern of the return light.

Therefore, recently, it has been considered to detect a failure of the optical fiber transmission line by applying an optical fiber sensing technology to a PON system.

However, since the PON system has a configuration in which a plurality of ONUs are connected to one OLT via an optical fiber transmission line, there are a wide variety of locations where failures may occur. Specifically, a failure may occur not only in an optical fiber transmission line connected to the OLT but also in a plurality of optical fiber transmission lines connected to each of a plurality of ONUs.

Therefore, when the optical fiber sensing technology is applied to the PON system, it is particularly necessary to individually detect a failure in a plurality of optical fiber transmission lines connected to each of a plurality of ONUs.

In the technology disclosed in Patent Literature 1, it is possible to individually detect a failure in a plurality of optical fiber transmission lines connected to each of a plurality of ONUs.

However, the technology disclosed in Patent Literature 1 does not apply an optical fiber sensing technology. In addition, the technology disclosed in Patent Literature 1 has a problem that the plurality of optical fiber transmission lines connected to the plurality of ONUs need to have different lengths, and a problem that communication needs to be stopped in order to detect a failure.

Therefore, in view of the above-described problems, an object of the present disclosure is to provide an optical fiber sensing system, an optical fiber sensing method, and an ONU that can individually detect a failure in a plurality of optical fiber transmission lines connected to each of a plurality of ONUs when an optical fiber sensing technology is applied to a PON system.

Solution to Problem

According to an aspect, there is provided an optical fiber sensing system including:

- an optical line terminal (OLT);
- a plurality of optical network units (ONUs);
- a first optical fiber transmission line connected to the OLT;
- a plurality of second optical fiber transmission lines connected to each of the plurality of ONUs;
- an optical output unit configured to output pulsed light to the first optical fiber transmission line;
- a plurality of reflection units provided in each of the plurality of second optical fiber transmission lines;
- a branching unit configured to connect the first optical fiber transmission line and each of the plurality of second optical fiber transmission lines, output the pulsed light output to the first optical fiber transmission line to each of the plurality of second optical fiber transmission lines, and output reflected light obtained by reflecting the pulsed light in any of the plurality of reflection units to the first optical fiber transmission line;

an optical input unit configured to receive the reflected light from the first optical fiber transmission line; and a detection unit configured to analyze a pattern of the reflected light to detect a failure of the second optical fiber transmission line provided with the reflection unit that has output the reflected light, in which each of the plurality of reflection units can individually switch execution of reflection of the pulsed light.

According to an aspect, there is provided an optical fiber sensing method by an optical fiber sensing system, the optical fiber sensing system including an optical line terminal (OLT), a plurality of optical network units (ONUs), a first optical fiber transmission line connected to the OLT, a plurality of second optical fiber transmission lines connected to each of the plurality of ONUs, a branching unit configured to connect the first optical fiber transmission line and each of the plurality of second optical fiber transmission lines, and a plurality of reflection units provided in each of the plurality of second optical fiber transmission lines and capable of individually switching execution of reflection of pulsed light from the second optical fiber transmission line, the optical fiber sensing method including:

a switching step of sequentially switching the plurality of reflection units one by one so as to execute the reflection of the pulsed light;

an optical output step of outputting the pulsed light from the first optical fiber transmission line to each of the plurality of second optical fiber transmission lines via the branching unit;

a reflection step of outputting, to the first optical fiber transmission line, reflected light obtained by reflecting the pulsed light in one of the plurality of reflection units switched to execute the reflection of the pulsed light;

an optical reception step of receiving the reflected light from the first optical fiber transmission line; and a detection step of detecting a failure in the second optical fiber transmission line including one of the reflection units by analyzing a pattern of the reflected light.

According to an aspect, there is provided an ONU among a plurality of optical network units (ONUs) in an optical fiber sensing system including an optical line terminal (OLT), the plurality of ONUs, a first optical fiber transmission line connected to the OLT, a plurality of second optical fiber transmission lines connected to each of the plurality of ONUs, and a branching unit connecting the first optical fiber transmission line and each of the plurality of second optical fiber transmission lines, the ONU including a reflection unit, in which the reflection unit can individually switch execution of reflection of pulsed light from the second optical fiber transmission line.

According to the above aspects, when an optical fiber sensing technology is applied to a PON system, it is possible to provide an optical fiber sensing system, an optical fiber sensing method, and an ONU capable of individually detecting a failure in the plurality of optical fiber transmission lines connected to each of the plurality of ONUs.

EXAMPLE EMBODIMENT

Example embodiments of the present disclosure are described below with reference to the drawings. Note that in the description and drawings to be described below, omission and simplification are made as appropriate, for clarity of description. Furthermore, in each of the drawings to be described below, the same elements are denoted by the same reference signs, and an overlapping description will be omitted as necessary.

First Example Embodiment

First, a configuration example of an optical fiber sensing system according to a first example embodiment will be described with reference to FIG. 1.

Figure 1:
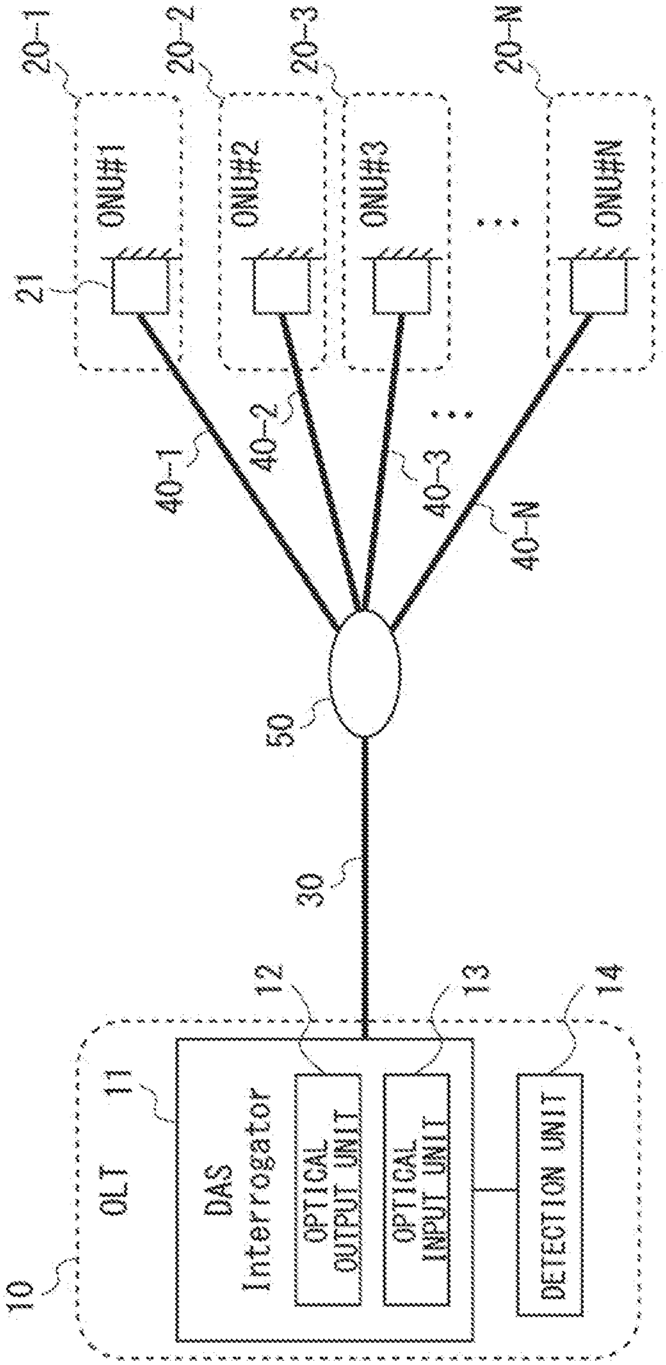
FIG. 1 is a diagram illustrating a configuration example of an optical fiber sensing system according to a first example embodiment.

As illustrated in FIG. 1, an optical fiber sensing system according to the first example embodiment includes an OLT 10, a plurality of ONUs 20-1 to 20-N (N is an integer of 2 or more), an optical fiber transmission line 30, a plurality of optical fiber transmission lines 40-1 to 40-N, and a branching unit 50. Hereinafter, when an ONU 20-1 to 20-N is not specified, the ONU is appropriately referred to as an "ONU 20". Similarly, the optical fiber transmission lines 40-1 to 40-N are appropriately referred to as an "optical fiber transmission lines 40".

The OLT 10 and the plurality of ONUs 20-1 to 20-N are components constituting a PON system. In the first example embodiment, the OLT 10 functions as an optical fiber sensing device.

The optical fiber transmission line 30 is connected to the OLT 10. The optical fiber transmission line 30 includes an optical fiber. The optical fiber transmission line 30 is an example of a first optical fiber transmission line.

The plurality of optical fiber transmission lines 40-1 to 40-N are connected to the plurality of ONUs 20-1 to 20-N, respectively. The optical fiber transmission line 40 includes an optical fiber. The optical fiber transmission line 40 is an example of a second optical fiber transmission line.

The branching unit 50 connects the optical fiber transmission line 30 and the plurality of optical fiber transmission lines 40-1 to 40-N. The branching unit 50 includes a coupler, an optical filter, and the like.

The OLT 10 includes a distributed acoustic sensing (DAS) interrogator 11 and a detection unit 14. The DAS interrogator 11 further includes an optical output unit 12 and an optical input unit 13.

However, the DAS interrogator 11 and the detection unit 14 may be provided on the OLT 10 side as viewed from the branching unit 50. That is, the DAS interrogator 11 and the detection unit 14 may be provided inside or outside the OLT 10 as long as they are provided on the OLT 10 side.

The optical output unit 12 outputs pulsed light to the optical fiber transmission line 30. The pulsed light is used to detect a failure in the optical fiber transmission lines 30 and 40-1 to 40-N. As the pulsed light, it is preferable to use pulsed light in a band not used in a main signal for the PON system. As a result, even during transmission of the main signal, that is, during operation of the PON system, it is possible to detect a failure in the optical fiber transmission lines 30 and 40-1 to 40-N.

Note that operations of the optical input unit 13 and the detection unit 14 will be described later.

The branching unit 50 outputs the pulsed light output from the optical output unit 12 to the optical fiber transmission line 30 to each of the plurality of optical fiber transmission lines 40-1 to 40-N. When the main signal for communication is output from the optical output unit 12 to the optical fiber transmission line 30, the branching unit 50 also outputs the main signal to each of the plurality of optical fiber transmission lines 40-1 to 40-N.

Note that the branching unit 50 may be configured by a branching unit of the WDM-PON system. In the WDM-PON system, different wavelengths are allocated to each of the plurality of optical fiber transmission lines 40-1 to 40-N. Therefore, the branching unit of the WDM-PON system has a filter function for extracting pulsed light of each wavelength. Therefore, when the branching unit 50 is configured by the branching unit of the WDM-PON system, the filter function of the branching unit is set such that the pulsed light output to the optical fiber transmission line 30 is output to all of the plurality of optical fiber transmission lines 40-1 to 40-N regardless of the wavelength thereof.

Each of the plurality of ONUs 20-1 to 20-N includes a reflection unit 21.

However, the reflection unit 21 may be provided on the ONU 20 side as viewed from the branching unit 50. That is, the reflection unit 21 may be provided inside or outside the ONU 20 as long as it is provided on the ONU 20 side.

The reflection unit 21 has a function of reflecting the pulsed light from the optical fiber transmission line 40. The reflection unit 21 includes a reflective gain element and the like. In a case where the reflection unit 21 includes the reflective gain element, the reflection unit 21 reflects the pulsed light, amplifies the reflected light, and outputs the amplified reflected light.

Each of the plurality of reflection units 21 in the plurality of ONUs 20-1 to 20-N can individually switch between execution and non-execution of reflection of the pulsed light.

In the first example embodiment, the plurality of reflection units 21 are sequentially switched one by one so as to execute the reflection of the pulsed light. After the switching, as will be described later, the failure detection of the optical fiber transmission line 40 connected to the ONU 20 provided with the reflection unit 21 is performed by using the reflected light obtained by reflecting the pulsed light by the reflection unit 21 executing the reflection of the pulsed light, and when the failure detection is completed, another reflection unit 21 is switched to execute the reflection of the pulsed light.

A method of switching the execution of the reflection of the pulsed light by the reflection unit 21 will be described later.

As the pulsed light is transmitted through the optical fiber transmission line 30, backscattered light is generated in the optical fiber transmission line 30. The backscattered light is received by the optical input unit 13. In addition, as the pulsed light is transmitted through each of the optical fiber transmission lines 40-1 to 40-N, the backscattered light is also generated in each of the optical fiber transmission lines 40-1 to 40-N. The backscattered light is multiplexed by the branching unit 50, output to the optical fiber transmission line 30, and received by the optical input unit 13. Furthermore, the reflected light obtained by reflecting the pulsed light by any of the plurality of reflection units 21 is output to the optical fiber transmission line 30 by the branching unit 50 and received by the optical input unit 13.

As described above, the optical input unit 13 receives, as return light, the backscattered light generated in the optical fiber transmission line 30, the backscattered light generated in each of the optical fiber transmission lines 40-1 to 40-N and multiplexed, and the reflected light obtained by reflecting the pulsed light in any of the plurality of reflection units 21.

The detection unit 14 can specify a location (distance from the OLT 10) where the return light is generated based on a time difference between a time when the pulsed light is output by the optical output unit 12 and a time when the return light is received by the optical input unit 13.

Furthermore, the detection unit 14 can specify whether the return light is any of the following based on the location where the return light is generated.

- Backscattered light generated in optical fiber transmission line 30
- Backscattered light generated in each of the optical fiber transmission lines 40-1 to 40-N and multiplexed
- Reflected light in which pulsed light is reflected by any of the plurality of reflection units 21

Furthermore, for example, in a case where the return light is reflected light obtained by reflecting the pulsed light by the reflection unit 21 in the ONU 20-1, sound generated around the optical fiber transmission line 40-1 connected to the ONU 20-1 is transmitted to the optical fiber transmission line 40-1, and as a result, characteristics (for example, the wavelength) of the return light change.

Therefore, the detection unit 14 can calculate the acoustic intensity of the sound generated around the optical fiber transmission line 40-1 based on the degree of change in the characteristic of the return light.

The detection unit 14 can similarly calculate the acoustic intensity also in a case where the return light is backscattered light generated in the optical fiber transmission line 30 or in a case where the return light is backscattered light generated in each of the optical fiber transmission lines 40-1 to 40-N and multiplexed.

Figure 2:
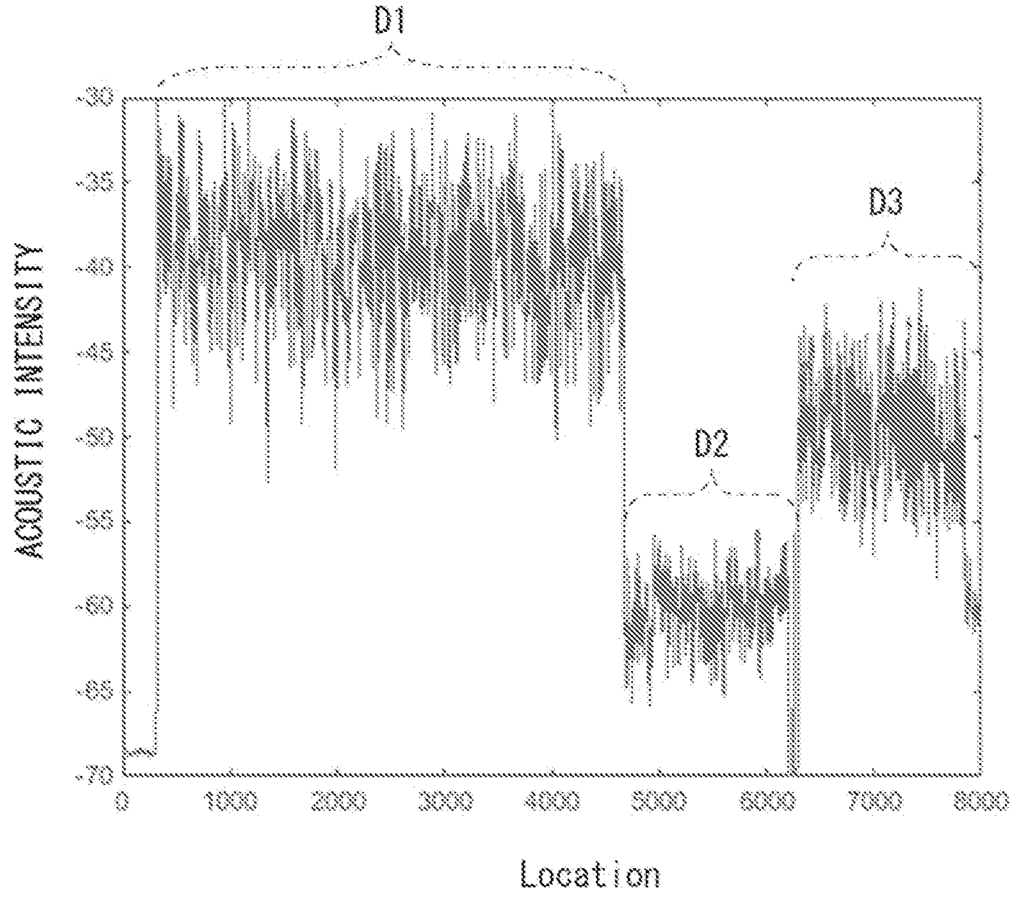
FIG. 2 is a diagram illustrating an example of acoustic data acquired from return light by a detection unit according to the first example embodiment.

Therefore, the detection unit 14 can acquire acoustic data as illustrated in FIG. 2 based on the return light received by the optical input unit 13. Note that FIG. 2 illustrates an example of acoustic data at an arbitrary time in a situation where only the reflection unit 21 in the ONU 20-1 executes reflection. In FIG. 2, a horizontal axis represents the location (the distance from the OLT 10) where the return light is generated, and a vertical axis represents the acoustic intensity.

In FIG. 2, acoustic data D1 is acoustic data of backscattered light generated in the optical fiber transmission line 30. An acoustic pattern appears in the acoustic data D1, and this acoustic pattern becomes a different pattern according to the presence or absence of a failure in the optical fiber transmission line 30.

Therefore, the detection unit 14 can detect the failure of the optical fiber transmission line 30 by analyzing the acoustic pattern appearing in the acoustic data D1.

Furthermore, in FIG. 2, acoustic data D3 is acoustic data of reflected light obtained by reflecting pulsed light by the reflection unit 21 in the ONU 20-1. An acoustic pattern appearing in the acoustic data D3 is also different depending on the presence or absence of a failure in the optical fiber transmission line 40-1 connected to the ONU 20-1.

Therefore, the detection unit 14 can detect the failure of the optical fiber transmission line 40-1 by analyzing the acoustic pattern appearing in the acoustic data D3.

Meanwhile, in FIG. 2, acoustic data D2 is acoustic data of backscattered light generated and multiplexed in each of the optical fiber transmission lines 40-1 to 40-N. Therefore, even when the acoustic pattern appearing in the acoustic data D2 is the acoustic pattern when the failure occurs, it is not possible to specify in which optical fiber transmission line 40 the failure has occurred.

Therefore, the detection unit 14 does not use the acoustic data D2 for failure detection.

Here, a specific method in which the detection unit 14 detects the failure in the optical fiber transmission lines 30 and 40 will be described. Here, an example of a method for detecting a failure of the optical fiber transmission line 40-1 connected to the ONU 21-1 in a situation where the reflection unit 21 in the ONU 21-1 is performing reflection will be described.

(A1) Method A1

The detection unit 14 stores in advance the acoustic pattern appearing in the acoustic data when a failure occurs in the optical fiber transmission line 40-1 in a memory (not illustrated) or the like as a matching pattern. Note that the matching pattern may be an individual pattern for each of the optical fiber transmission lines 40-1 to 40-N, or may be a pattern common to the optical fiber transmission lines 40-1 to 40-N.

First, the detection unit 14 acquires acoustic data of the reflected light based on the reflected light reflected by the reflection unit 21 in the ONU 21-1 among the return light received by the optical input unit 13.

Subsequently, the detection unit 14 compares the acoustic pattern included in the acoustic data acquired above with the matching pattern. As a result, when a matching rate between the acoustic pattern and the matching pattern is equal to or more than a threshold value, the detection unit 14 determines that a failure has occurred in the optical fiber transmission line 40-1.

(A2) Method A2

The detection unit 14 prepares a set of teacher data indicating the presence or absence of the failure in the optical fiber transmission line 40-1 and an acoustic pattern appearing in the acoustic data at that time, and inputs each of the prepared sets to construct a learning model by a convolutional neural network (CNN) in advance and store the learning model in advance in a memory (not illustrated) or the like. Note that the learning model may be an individual learning model for each of the optical fiber transmission lines 40-1 to 40-N, or may be a learning model common to the optical fiber transmission lines 40-1 to 40-N.

First, the detection unit 14 acquires acoustic data of the reflected light based on the reflected light reflected by the reflection unit 21 in the ONU 21-1 among the return light received by the optical input unit 13.

Subsequently, the detection unit 14 inputs the acoustic pattern included in the acoustic data acquired above to the learning model. As a result, the detection unit 14 obtains information indicating the presence or absence of the failure in the optical fiber transmission line 40-1 as an output result of the learning model.

Note that, even in a case where the detection unit 14 detects the failure in the optical fiber transmission line 30, it is only required to detect the failure in the optical fiber transmission line 30 using a method substantially similar to the method A1 or A2 described above.

The OLT 10 includes the DAS interrogator 11, but may include a distributed vibration sensing (DVS) interrogator instead. In this case, the detection unit 14 may acquire vibration data based on the return light received by the optical input unit 13, and analyze a vibration pattern included in the acquired vibration data to detect the failure in the optical fiber transmission lines 30 and 40.

In addition, the OLT 10 may include a distributed temperature sensing (DTS) interrogator instead of the DAS interrogator 11. In this case, the detection unit 14 may acquire temperature data based on the return light received by the optical input unit 13, and analyze a temperature pattern included in the acquired temperature data to detect the failure in the optical fiber transmission lines 30 and 40.

In addition, when the detection unit 14 determines that a failure has occurred in any of the optical fiber transmission lines 30 and 40-1 to 40-N, the detection unit 14 may notify the optical fiber transmission line 30 or 40 in which the failure has occurred by displaying the optical fiber transmission line on a display unit (not illustrated) or the like.

In addition, the detection unit 14 can specify a failure occurrence location (distance from the OLT 10) on the optical fiber transmission line 30 or 40 in which the failure has occurred as well as the optical fiber transmission line 30 or 40 in which the failure has occurred, based on the acoustic data as illustrated in FIG. 2. Therefore, when it is determined that the failure has occurred in any of the optical fiber transmission lines 30 and 40-1 to 40-N, the detection unit 14 may notify not only the optical fiber transmission line 30 or 40 in which the failure has occurred but also the failure occurrence location.

When it is determined that the failure has occurred in any of the optical fiber transmission lines 40-1 to 40-N, the detection unit 14 may notify the ONU 20 connected to the optical fiber transmission line 40 in which the failure has occurred.

Subsequently, a method of switching the execution of the reflection of the pulsed light by the reflection unit 21 will be described in detail below.

As described above, the plurality of reflection units 21 are sequentially switched one by one so as to execute the reflection of the pulsed light.

For example, first, the reflection of pulsed light is executed for the reflection unit 21 in the ONU 20-1. At this time, the reflection unit 21 in the other ONUs 20-2 to 20-N is caused to stop the execution of the reflection of the pulsed light.

In this state, the detection unit 14 detects the failure in the optical fiber transmission line 40-1 connected to the ONU 20-1. After the failure detection of the optical fiber transmission line 40-1 is completed, the execution of the reflection of the pulsed light by the reflection unit 21 in the ONU 20-1 is stopped.

Next, the pulsed light is reflected by the reflection unit 21 in another ONU 20 (for example, the ONU 20-2).

Thereafter, the above operation is repeated, and the plurality of reflection units 21 in the plurality of ONUs 20-1 to 20-N are sequentially switched one by one so as to execute reflection of pulsed light.

At this time, in the plurality of reflection units 21, specifically, the execution of the reflection of the pulsed light is switched using any one of the following methods.

(B1) Method B1

A method B1 is a method of performing switching by time.

In the method B1, the reflection unit 21 that reflects the pulsed light is switched every time slot. As a result, the failure detection of the plurality of optical fiber transmission lines 40-1 to 40-N connected to the plurality of ONUs 20-1 to 20-N is individually performed.

In the method B1, for example, different time slots may be set for each of the plurality of reflection units 21. Each of the plurality of reflection units 21 may reflect the pulsed light in the time slot set in its own reflection unit 21.

Figure 3:
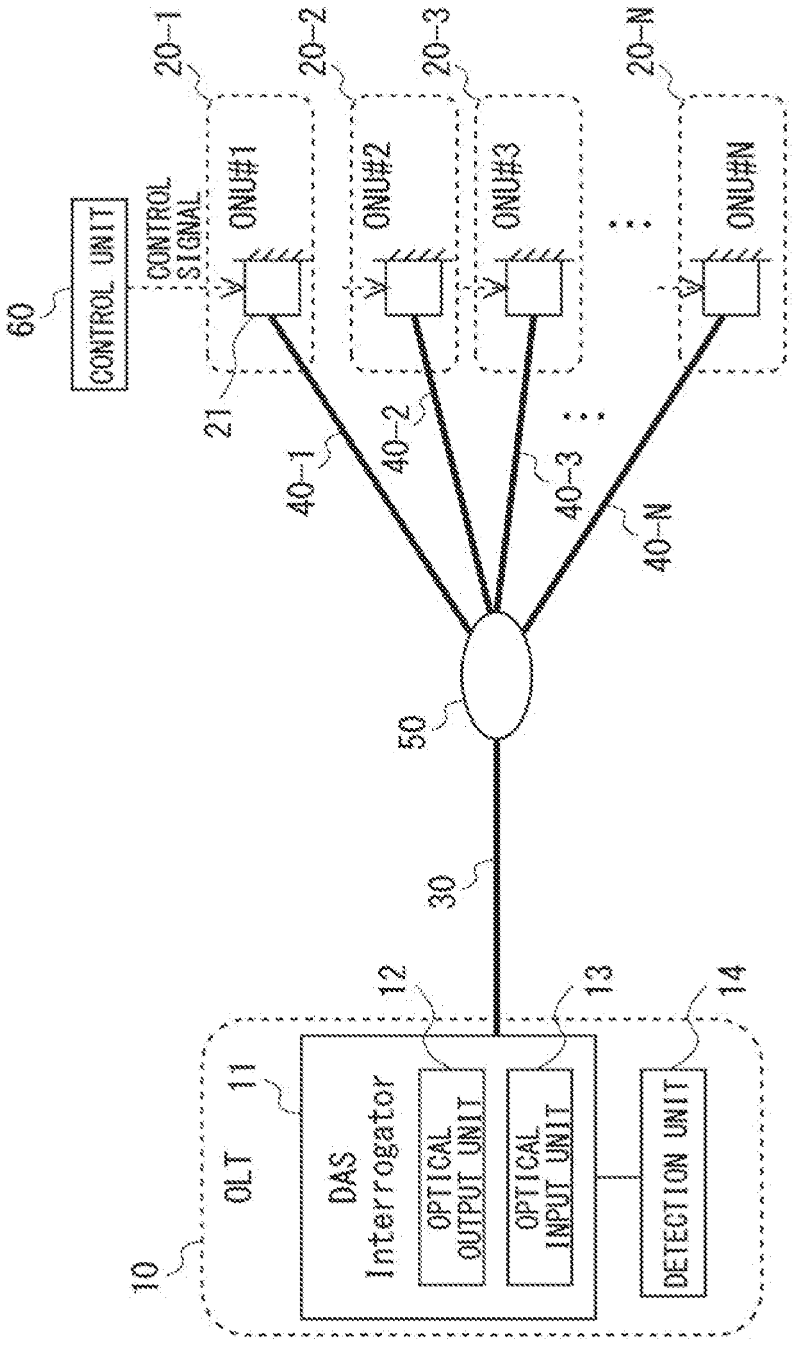
FIG. 3 is a diagram illustrating a modified configuration example of the optical fiber sensing system according to the first example embodiment.

Alternatively, as illustrated in FIG. 3, a control unit 60 that transmits a control signal instructing whether to execute the reflection of the pulsed light to each of the plurality of reflection units 21 according to the time slot may be further provided. Then, each of the plurality of reflection units 21 may execute the reflection of the pulsed light based on the control signal from the control unit 60. Note that the control unit 60 may be provided in the OLT 10 or may be provided in an external control device (not illustrated).

(B2) Method B2

A method B2 is a method of performing switching by an individual instruction.

In the method B2, for example, as illustrated in FIG. 3, the control unit 60 that transmits a control signal instructing whether to execute reflection of the pulsed light to each of the plurality of reflection units 21 may be further provided. Then, each of the plurality of reflection units 21 may execute the reflection of the pulsed light based on the control signal from the control unit 60. Note that the control unit 60 may be provided in the OLT 10 or may be provided in an external control device (not illustrated).

(B3) Method B3

A method B3 is a method of performing switching based on error detection on the ONU 20 side.

In the method B3, for example, when a reception error of pulsed light is detected, the ONU 20 may execute reflection of the pulsed light by the reflection unit 21 in the ONU 20.

Subsequently, an example of a schematic operation flow of the optical fiber sensing system according to the first example embodiment will be described with reference to FIG. 4.

Figure 4:
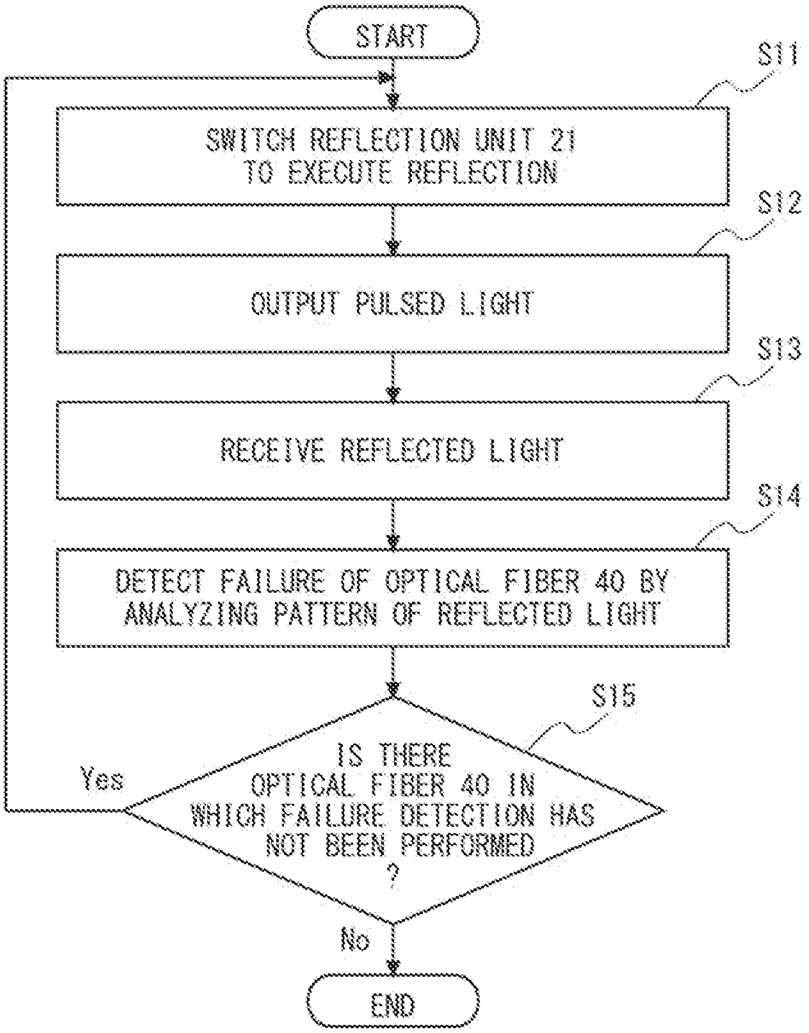
FIG. 4 is a flowchart illustrating an example of a schematic operation flow of the optical fiber sensing system according to the first example embodiment.

As illustrated in FIG. 4, first, among the plurality of reflection units 21 in the plurality of ONUs 20-1 to 20-N, one reflection unit 21 is switched to execute reflection of pulsed light (Step S11).

Next, the optical output unit 12 outputs pulsed light to the optical fiber transmission line 30 (Step S12). The pulsed light is output to each of the optical fiber transmission lines 40-1 to 40-N by the branching unit 50.

Then, the pulsed light is reflected by one reflection unit 21 switched in Step S11, and the reflected light is output to the optical fiber transmission line 30 by the branching unit 50 and received by the optical input unit 13 (Step S13).

Next, the detection unit 14 analyzes the acoustic pattern of the reflected light received by the optical input unit 13 to detect the failure in the optical fiber transmission line 40 connected to the ONU 20 provided with the reflection unit 21 that has output the reflected light (Step S14).

After completion of Step S14, when there is an optical fiber transmission line 40 for which failure detection has not been performed (Yes in Step S15), the process returns to Step S11. In Step S11, switching is performed such that reflection of pulsed light is executed for one of 21 the reflection units 21 in the ONU 20 connected to the optical fiber transmission line 40 for which failure detection has not been performed.

Meanwhile, after completion of Step S14, when there is no optical fiber transmission line 40 for which failure detection has not been performed (No in Step S15), the process ends.

As described above, according to the first example embodiment, the reflection unit 21 is provided in each of the plurality of optical fiber transmission lines 40-1 to 40-N. Each of the plurality of reflection units 21 can individually switch the execution of the reflection of the pulsed light.

Therefore, for example, when only the reflection unit 21 provided in one optical fiber transmission line 40 among the plurality of optical fiber transmission lines 40-1 to 40-N executes reflection of the pulsed light, the reflected light from the one optical fiber transmission line 40 is received by the optical input unit 13, and thus the detection unit 14 can detect the failure in the one optical fiber transmission line 40. As a result, even when the optical fiber sensing technology is applied to the PON system, failure detection of the plurality of optical fiber transmission lines 40-1 to 40-N can be individually performed. In addition, unlike the technology disclosed in Patent Literature, it is not necessary to set the lengths of the plurality of optical fiber transmission lines 40-1 to 40-N to be different from each other or to stop communication in order to detect a failure.

Modified Example of First Example Embodiment

In the first example embodiment described above, the reflection unit 21 is provided in all of the plurality of optical fiber transmission lines 40-1 to 40-N, but the present disclosure is not limited thereto.

For example, when the plurality of optical fiber transmission lines 40-1 to 40-N includes the optical fiber transmission line 40 that is not the failure detection target, the reflection unit 21 may not be provided in the optical fiber transmission line 40 that is not the failure detection target.

Figure 5:
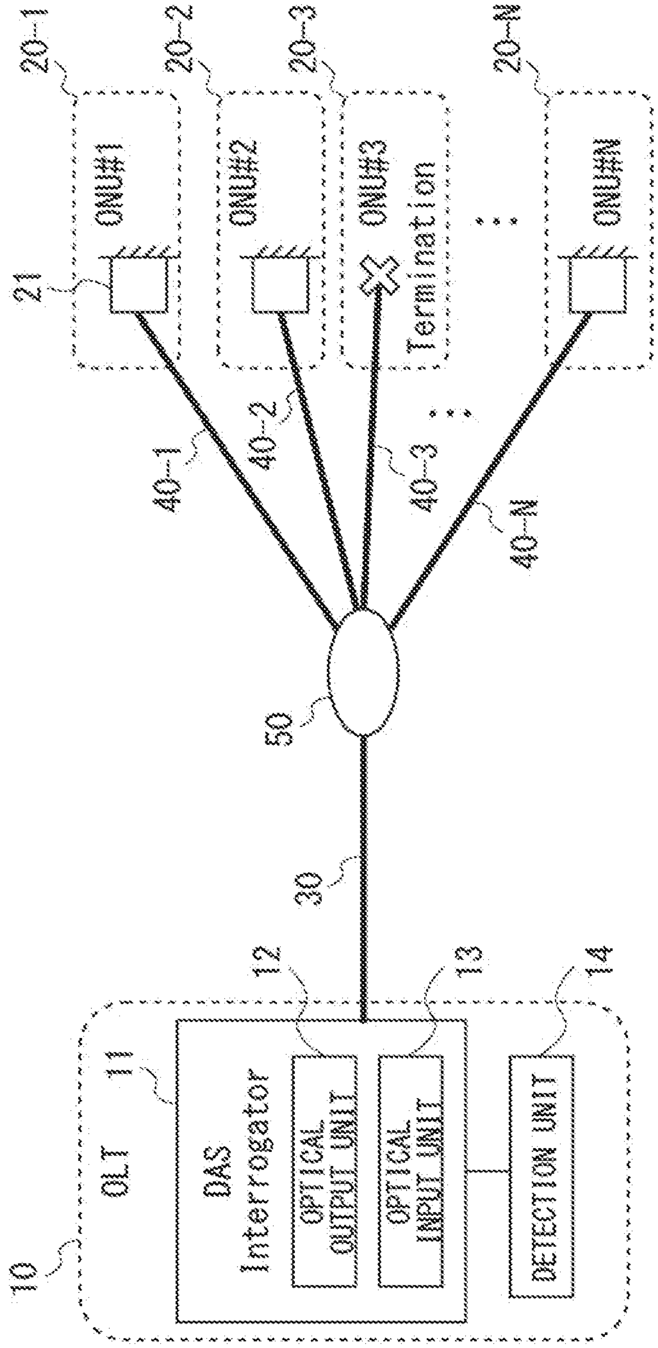
FIG. 5 is a diagram illustrating another modified configuration example of the optical fiber sensing system according to the first example embodiment.

For example, in the example of FIG. 5, among the plurality of optical fiber transmission lines 40-1 to 40-N, the optical fiber transmission line 40-3 is not the failure detection target. Therefore, the reflection unit 21 is not provided in the ONU 20-3 connected to the optical fiber transmission line 40-3. Therefore, when the pulsed light is transmitted, the ONU 20-3 terminates the pulsed light.

Second Example Embodiment

In the first example embodiment described above, the OLT 10 functions as an optical fiber sensing device.

Meanwhile, in the second example embodiment, each of the plurality of ONUs 20-1 to 20-N functions as an optical fiber sensing device.

A configuration example of an optical fiber sensing system according to the second example embodiment will be described with reference to FIG. 6.

Figure 6:
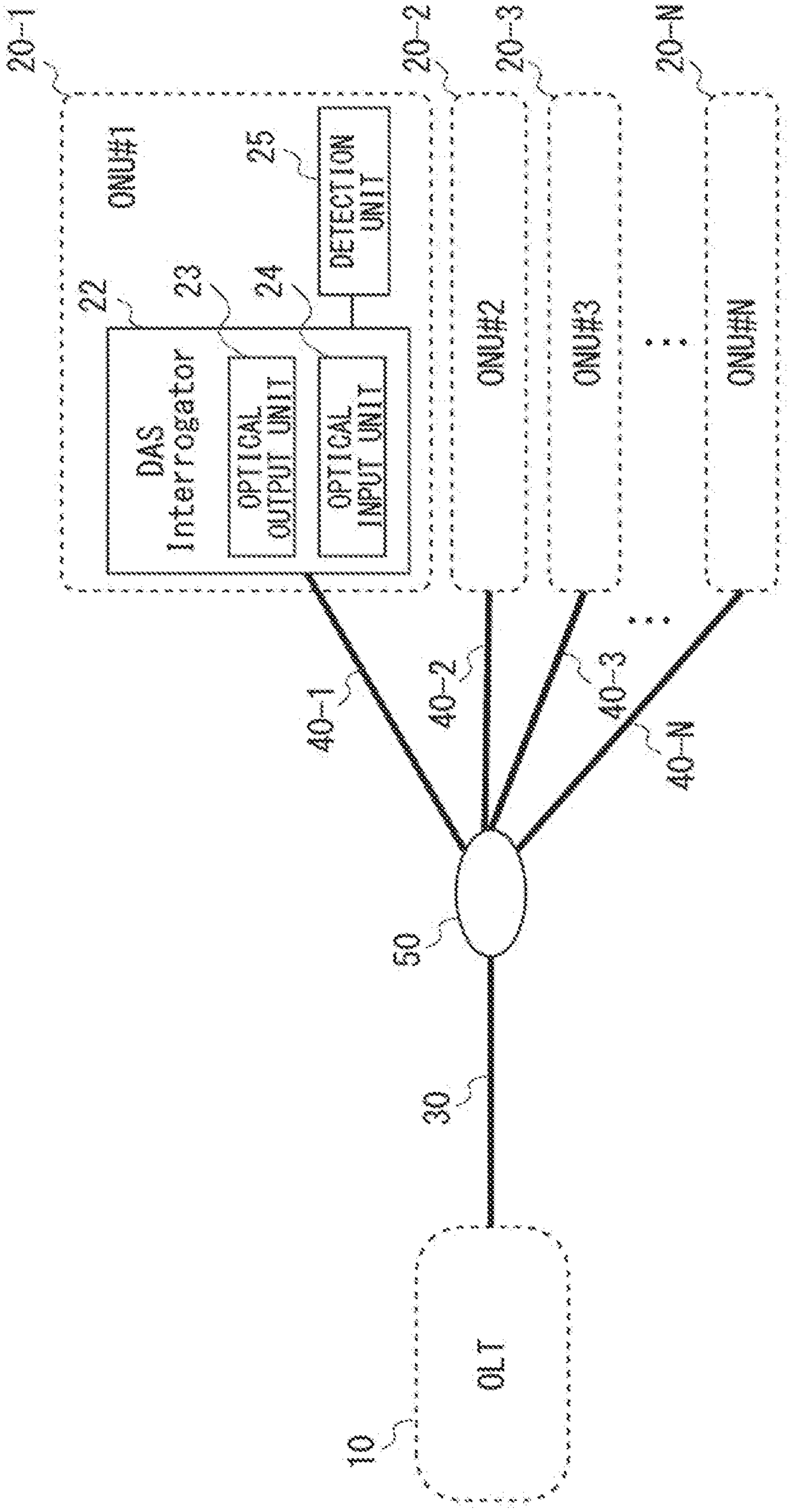
FIG. 6 is a diagram illustrating a configuration example of an optical fiber sensing system according to a second example embodiment.

As illustrated in FIG. 6, in the optical fiber sensing system according to the second example embodiment, each of the plurality of ONUs 20-1 to 20-N includes a DAS interrogator 22 and a detection unit 25 corresponding to the DAS interrogator 11 and the detection unit 14 according to the first example embodiment described above. In addition, the DAS interrogator 22 includes an optical output unit 23 and an optical input unit 24 corresponding to the optical output unit 12 and the optical input unit 13 according to the first example embodiment described above.

Each of the plurality of optical output units 23 in the plurality of ONUs 20-1 to 20-N can individually switch between execution and non-execution of pulsed light output.

In the second example embodiment, the plurality of optical output units 23 is switched so as to sequentially output the pulsed light one by one. As a method of switching the execution of the output of the pulsed light by the optical output unit 23, a method similar to that of the above-described first example embodiment may be used.

For example, in a situation where only the optical output unit 23 in the ONU 20-1 is executing the output of the pulsed light, the optical input unit 24 in the ONU 20-1 receives the backscattered light generated in the optical fiber transmission line 30 and the backscattered light generated in the optical fiber transmission line 40-1 as return light.

Therefore, the detection unit 25 in the ONU 20-1 can detect the failure of the optical fiber transmission line 30 by analyzing the acoustic pattern of the backscattered light generated in the optical fiber transmission line 30 among the return light received by the optical input unit 24.

In addition, the detection unit 25 in the ONU 20-1 can detect the failure in the optical fiber transmission line 40-1 by analyzing the acoustic pattern of the backscattered light generated in the optical fiber transmission line 40-1 among the return light received by the optical input unit 24.

As a result, also in the second example embodiment, the failure detection of the plurality of optical fiber transmission lines 40-1 to 40-N can be individually performed.

<Hardware Configuration of OLT and ONU (Optical Fiber Sensing Device)>

Next, a hardware configuration example of a computer 70 that implements the OLT 10 that functions as the optical fiber sensing device in the above-described first example embodiment and the ONU 20 that functions as the optical fiber sensing device in the above-described second example embodiment will be described with reference to FIG. 7.

Figure 7:
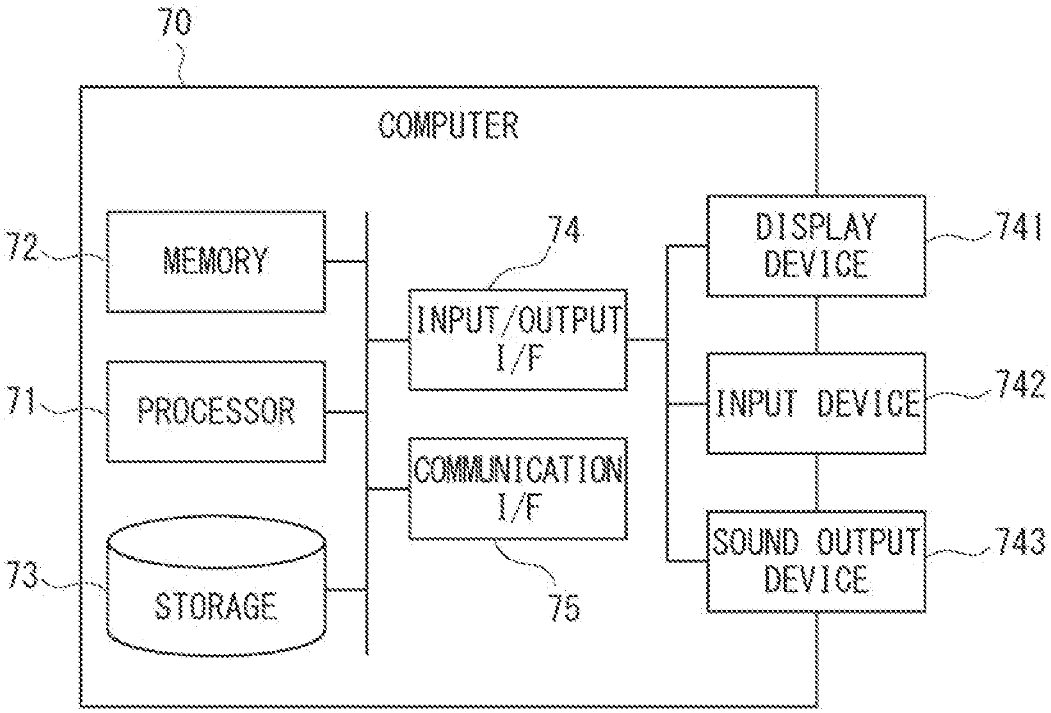
FIG. 7 is a block diagram illustrating a hardware configuration example of a computer that implements an OLT and an ONU according to an example embodiment.

As illustrated in FIG. 7, the computer 70 includes a processor 71, a memory 72, a storage 73, an input/output interface (input/output I/F) 74, a communication interface (communication I/F) 75, and the like. The processor 71, the memory 72, the storage 73, the input/output interface 74, and the communication interface 75 are connected by a data transmission path for mutually transmitting and receiving data.

The processor 71 is an arithmetic processing unit such as a central processing unit (CPU) or a graphics processing unit (GPU). The memory 72 is, for example, a memory such as a random access memory (RAM) or a read only memory (ROM). The storage 73 is, for example, a storage device such as a hard disk drive (HDD), a solid state drive (SSD), or a memory card. Furthermore, the storage 73 may be a memory such as a RAM or a ROM.

A program is stored in the storage 73. This program includes a command group (or software code) for causing the computer 70 to perform one or more functions in the OLT 10 and the ONU 20 described above when read by the computer. The optical output units 12 and 23, the optical input units 13 and 24, and the detection units 14 and 25 in the ONU 21 described above may be implemented by the processor 71 reading and executing a program stored in the storage 73. In addition, the storage function in the OLT 10 and the ONU 20 described above may be realized by the memory 72 or the storage 73.

Furthermore, the above-described program may be stored in a non-transitory computer-readable medium or a tangible storage medium. As an example and not by way of limitation, the computer readable medium or the tangible storage medium includes a RAM, a ROM, a flash memory, an SSD or other memory technology, a compact disc (CD)-ROM, a digital versatile disc (DVD), a Blu-ray (registered trademark) disk or other optical disk storage, a magnetic cassette, a magnetic tape, a magnetic disk storage, or other magnetic storage devices. The program may be transmitted on a transitory computer readable medium or a communication medium. As an example and not by way of limitation, the transitory computer readable medium or the communication medium includes an electrical signal, an optical signal, an acoustic signal, or other forms of propagation signals.

The input/output interface 74 is connected to a display device 741, an input device 742, a sound output device 743, and the like. The display device 741 is a device that displays a screen corresponding to drawing data processed by the processor 71, such as a liquid crystal display (LCD), a cathode ray tube (CRT) display, or a monitor. The input device 742 is a device that receives an operation input of an operator, and is, for example, a keyboard, a mouse, a touch sensor, or the like. The display device 741 and the input device 742 may be integrated and implemented as a touch panel. The sound output device 743 is an apparatus that acoustically outputs a sound corresponding to acoustic data processed by the processor 71, such as a speaker.

The communication interface 75 transmits and receives data to and from an external device. For example, the communication interface 75 communicates with an external device via a wired communication path or a wireless communication path.

The present disclosure has been described above with reference to the example embodiments, but the present disclosure is not limited to the example embodiments described above. Various modifications that could be understood by those skilled in the art can be made to the configuration and details of the present disclosure within the scope of the present disclosure.

In addition, some or all of the above-described example embodiments may be described in the appendix below, but are not limited thereto.

(Supplementary Note 1)

An optical fiber sensing system including:

- an optical line terminal (OLT);
- a plurality of optical network units (ONUs);
- a first optical fiber transmission line connected to the OLT:
- a plurality of second optical fiber transmission lines connected to each of the plurality of ONUs:
- an optical output unit configured to output pulsed light to the first optical fiber transmission line:
- a plurality of reflection units provided in each of the plurality of second optical fiber transmission lines:
- a branching unit configured to connect the first optical fiber transmission line and each of the plurality of second optical fiber transmission lines, output the pulsed light output to the first optical fiber transmission line to each of the plurality of second optical fiber transmission lines, and output reflected light obtained by reflecting the pulsed light in any of the plurality of reflection units to the first optical fiber transmission line:

an optical input unit configured to receive the reflected light from the first optical fiber transmission line; and a detection unit configured to analyze a pattern of the reflected light to detect a failure of the second optical fiber transmission line provided with the reflection unit that has output the reflected light, in which each of the plurality of reflection units can individually switch execution of reflection of the pulsed light.

(Supplementary Note 2)

The optical fiber sensing system according to Supplementary Note 1, in which the plurality of reflection units are sequentially switched one by one to execute the reflection of the pulsed light.

(Supplementary Note 3)

The optical fiber sensing system according to Supplementary Note 2, in which time slots different from each other are set in each of the plurality of reflection units, and each of the plurality of reflection units executes the reflection of the pulsed light in the time slot set to the reflection unit.

(Supplementary Note 4)

The optical fiber sensing system according to Supplementary Note 2, further including a control unit configured to transmit a control signal instructing whether to execute reflection of the pulsed light to each of the plurality of reflection units, in which each of the plurality of reflection units executes the reflection of the pulsed light based on the control signal.

(Supplementary Note 5)

The optical fiber sensing system according to any one of Supplementary Notes 1 to 4, in which when it is determined that a failure has occurred in any of the plurality of second optical fiber transmission lines, the detection unit notifies the second optical fiber transmission line in which the failure has occurred.

(Supplementary Note 6)

The optical fiber sensing system according to any one of Supplementary Notes 1 to 4, in which when it is determined that a failure has occurred in any of the plurality of second optical fiber transmission paths, the detection unit specifies a failure occurrence location on the second optical fiber transmission path in which the failure has occurred, and the detection unit notifies the second optical fiber transmission line in which the failure has occurred and the failure occurrence location.

(Supplementary Note 7)

The optical fiber sensing system according to any one of Supplementary Notes 1 to 4, in which when it is determined that a failure has occurred in any of the plurality of second optical fiber transmission lines, the detection unit notifies the ONU connected to the second optical fiber transmission line in which the failure has occurred.

(Supplementary Note 8)

The optical fiber sensing system according to any one of Supplementary Notes 1 to 7, in which the optical input unit receives, from the first optical fiber transmission line, backscattered light generated as the pulsed light is transmitted through the first optical fiber transmission line, and the detection unit detects a failure in the first optical fiber transmission line by analyzing a pattern of the backscattered light.

(Supplementary Note 9)

The optical fiber sensing system according to any one of Supplementary Notes 1 to 8, in which the optical output unit, the optical input unit, and the detection unit are included in the OLT.

(Supplementary Note 10)

The optical fiber sensing system according to any one of Supplementary Notes 1 to 9, in which the plurality of reflection units are provided in each of the plurality of ONUs.

(Supplementary Note 11)

An optical fiber sensing method by an optical fiber sensing system, the optical fiber sensing system including an optical line terminal (OLT), a plurality of optical network units (ONUs), a first optical fiber transmission line connected to the OLT, a plurality of second optical fiber transmission lines connected to each of the plurality of ONUs, a branching unit configured to connect the first optical fiber transmission line and each of the plurality of second optical fiber transmission lines, and a plurality of reflection units provided in each of the plurality of second optical fiber transmission lines and capable of individually switching execution of reflection of pulsed light from the second optical fiber transmission line, the optical fiber sensing method including:

a switching step of sequentially switching the plurality of reflection units one by one so as to execute the reflection of the pulsed light:

an optical output step of outputting the pulsed light from the first optical fiber transmission line to each of the plurality of second optical fiber transmission lines via the branching unit:

a reflection step of outputting, to the first optical fiber transmission line, reflected light obtained by reflecting the pulsed light in one of the plurality of reflection units switched to execute the reflection of the pulsed light:

an optical reception step of receiving the reflected light from the first optical fiber transmission line; and a detection step of detecting a failure in the second optical fiber transmission line including one of the reflection units by analyzing a pattern of the reflected light.

(Supplementary Note 12)

The optical fiber sensing method according to Supplementary Note 11, in which time slots different from each other are set in each of the plurality of reflection units, and in the switching step, each of the plurality of reflection units executes the reflection of the pulsed light in the time slot set in the reflection unit.

(Supplementary Note 13)

The optical fiber sensing method according to Supplementary Note 11, in which in the switching step, a control signal instructing whether to execute reflection of the pulsed light is transmitted to each of the plurality of reflection units, and each of the plurality of reflection units executes the reflection of the pulsed light based on the control signal.

(Supplementary Note 14)

The optical fiber sensing method according to any one of Supplementary Notes 11 to 13, further including a step of notifying, when it is determined that a failure has occurred in any of the plurality of second optical fiber transmission lines, the second optical fiber transmission line in which the failure has occurred.

(Supplementary Note 15)

The optical fiber sensing method according to any one of Supplementary Notes 11 to 13, further including:

a step of specifying, when it is determined that a failure has occurred in any of the plurality of second optical fiber transmission paths, a failure occurrence location on the second optical fiber transmission path in which the failure has occurred; and a step of notifying the second optical fiber transmission line in which the failure has occurred and the failure occurrence location.

(Supplementary Note 16)

The optical fiber sensing method according to any one of Supplementary Notes 11 to 13, further including a step of notifying, when it is determined that a failure has occurred in any of the plurality of second optical fiber transmission lines, the ONU connected to the second optical fiber transmission line in which the failure has occurred.

(Supplementary Note 17)

The optical fiber sensing method according to any one of Supplementary Notes 11 to 16, in which in the optical reception step, backscattered light generated as the pulsed light is transmitted through the first optical fiber transmission line is further received from the first optical fiber transmission line, and in the detection step, the failure in the first optical fiber transmission line is further detected by analyzing a pattern of the backscattered light.

(Supplementary Note 18)

An ONU among a plurality of optical network units (ONUs) in an optical fiber sensing system including an optical line terminal (OLT), the plurality of ONUs, a first optical fiber transmission line connected to the OLT, a plurality of second optical fiber transmission lines connected to each of the plurality of ONUs, and a branching unit connecting the first optical fiber transmission line and each of the plurality of second optical fiber transmission lines, the ONU including a reflection unit, in which the reflection unit individually switches execution of reflection of pulsed light from the second optical fiber transmission line.

(Supplementary Note 19)

The ONU according to Supplementary Note 18, in which each of the plurality of ONUs includes the reflection unit, and the plurality of reflection units included in each of the plurality of ONUs is sequentially switched one by one so as to execute the reflection of the pulsed light.

(Supplementary Note 20)

The ONU according to Supplementary Note 19, in which time slots different from each other are set in each of the plurality of reflection units, and the reflection unit executes the reflection of the pulsed light in the time slot set in the reflection unit.

(Supplementary Note 21)

The ONU according to Supplementary Note 19, in which the reflection unit executes the reflection of the pulsed light based on a control signal instructing whether to execute the reflection of the pulsed light.

REFERENCE SIGNS LIST

10 OLT
11 DAS INTERROGATOR
12 OPTICAL OUTPUT UNIT
13 OPTICAL INPUT UNIT
14 DETECTION UNIT
20-1 to 20-N ONU
21 REFLECTION UNIT
22 DAS INTERROGATOR
23 OPTICAL OUTPUT UNIT
24 OPTICAL INPUT UNIT
25 DETECTION UNIT
30 OPTICAL FIBER TRANSMISSION LINE
40-1 to 40-N OPTICAL FIBER TRANSMISSION LINE
50 BRANCHING UNIT
60 CONTROL UNIT
70 COMPUTER
71 PROCESSOR
72 MEMORY
73 STORAGE
74 INPUT/OUTPUT INTERFACE
741 DISPLAY DEVICE
742 INPUT DEVICE
743 SOUND OUTPUT DEVICE
75 COMMUNICATION INTERFACE

What is claimed is:

1. An optical fiber sensing system comprising:

an optical line terminal (OLT);

a plurality of optical network units (ONUs);

a first optical fiber transmission line connected to the OLT;

a plurality of second optical fiber transmission lines connected to each of the plurality of ONUs;

a plurality of reflectors provided in each of the plurality of second optical fiber transmission lines;

at least one memory storing instructions, and at least one processor configured to execute the instructions to;

output pulsed light to the first optical fiber transmission line;

connect the first optical fiber transmission line and each of the plurality of second optical fiber transmission lines, output the pulsed light output to the first optical fiber transmission line to each of the plurality of second optical fiber transmission lines, and output reflected light obtained by reflecting the pulsed light in any of the plurality of reflectors to the first optical fiber transmission line;

receive the reflected light from the first optical fiber transmission line; and analyze a pattern of the reflected light to detect a failure of the second optical fiber transmission line provided with the reflector that has output the reflected light, wherein each of the plurality of reflectors can individually switch execution of reflection of the pulsed light, wherein the plurality of reflectors are sequentially switched one by one to execute the reflection of the pulsed light, wherein time slots different from each other are set in each of the plurality of reflectors, and wherein each of the plurality of reflectors executes the reflection of the pulsed light in the time slot set to the reflector.

2. The optical fiber sensing system according to claim 1, wherein when it is determined that a failure has occurred in any of the plurality of second optical fiber transmission lines, the at least one processor is further configured to execute the instructions to notify the second optical fiber transmission line in which the failure has occurred.

3. The optical fiber sensing system according to claim 1, wherein when it is determined that a failure has occurred in any of the plurality of second optical fiber transmission paths, the at least one processor is further configured to execute the instructions to specify a failure occurrence location on the second optical fiber transmission path in which the failure has occurred, and the at least one processor is further configured to execute the instructions to notify the second optical fiber transmission line in which the failure has occurred and the failure occurrence location.

4. The optical fiber sensing system according to claim 1, wherein when it is determined that a failure has occurred in any of the plurality of second optical fiber transmission lines, the at least one processor is further configured to execute the instructions to notify the ONU connected to the second optical fiber transmission line in which the failure has occurred.

5. The optical fiber sensing system according to claim 1, wherein the at least one processor is further configured to execute the instructions to receive, from the first optical fiber transmission line, backscattered light generated as the pulsed light is transmitted through the first optical fiber transmission line, and detect a failure in the first optical fiber transmission line by analyzing a pattern of the backscattered light.

6. The optical fiber sensing system according to claim 1, wherein the at least one memory and the at least one processor are included in the OLT.

7. The optical fiber sensing system according to claim 1, wherein the plurality of reflectors are provided in each of the plurality of ONUs.

8. An optical fiber sensing method by an optical fiber sensing system, the optical fiber sensing system comprising:

an optical line terminal (OLT), a plurality of optical network units (ONUs), a first optical fiber transmission line connected to the OLT, a plurality of second optical fiber transmission lines connected to each of the plurality of ONUs, a branching device configured to connect the first optical fiber transmission line and each of the plurality of second optical fiber transmission lines, and a plurality of reflectors provided in each of the plurality of second optical fiber transmission lines and capable of individually switching execution of reflection of pulsed light from the second optical fiber transmission line, the optical fiber sensing method comprising:

sequentially switching the plurality of reflectors one by one so as to execute the reflection of the pulsed light;

outputting the pulsed light from the first optical fiber transmission line to each of the plurality of second optical fiber transmission lines via the branching device;

outputting, to the first optical fiber transmission line, reflected light obtained by reflecting the pulsed light in one of the plurality of reflectors switched to execute the reflection of the pulsed light;

receiving the reflected light from the first optical fiber transmission line; and detecting a failure in the second optical fiber transmission line including one of the reflectors by analyzing a pattern of the reflected light, wherein time slots different from each other are set in each of the plurality of reflectors, and wherein in the switching, each of the plurality of reflectors executes the reflection of the pulsed light in the time slot set in the reflector.

9. The optical fiber sensing method according to claim 8, further comprising notifying, when it is determined that a failure has occurred in any of the plurality of second optical fiber transmission lines, the second optical fiber transmission line in which the failure has occurred.

10. The optical fiber sensing method according to claim 8, further comprising:

specifying, when it is determined that a failure has occurred in any of the plurality of second optical fiber transmission paths, a failure occurrence location on the second optical fiber transmission path in which the failure has occurred; and notifying the second optical fiber transmission line in which the failure has occurred and the failure occurrence location.

11. The optical fiber sensing method according to claim 8, further comprising notifying, when it is determined that a failure has occurred in any of the plurality of second optical fiber transmission lines, the ONU connected to the second optical fiber transmission line in which the failure has occurred.

12. The optical fiber sensing method according to claim 8, wherein in the receiving, backscattered light generated as the pulsed light is transmitted through the first optical fiber transmission line is further received from the first optical fiber transmission line, and in the detecting, the failure in the first optical fiber transmission line is further detected by analyzing a pattern of the backscattered light.

13. An ONU among a plurality of optical network units (ONUs) in an optical fiber sensing system including an optical line terminal (OLT), the plurality of ONUs, a first optical fiber transmission line connected to the OLT, a plurality of second optical fiber transmission lines connected to each of the plurality of ONUs, and a branching device connecting the first optical fiber transmission line and each of the plurality of second optical fiber transmission lines, the ONU comprising a reflector, wherein the reflector individually switches execution of reflection of pulsed light from the second optical fiber transmission line, wherein each of the plurality of ONUs includes the reflector, wherein the plurality of reflectors included in each of the plurality of ONUs is sequentially switched one by one so as to execute the reflection of the pulsed light, wherein time slots different from each other are set in each of the plurality of reflectors, and wherein the reflector executes the reflection of the pulsed light in the time slot set in the reflector.

* * * * *